May 27, 1941.   N. M. THOMAS   2,243,363
COMBINATION FROZEN CONFECTION MOLD AND PROTECTIVE BASKET THEREFOR
Filed Dec. 14, 1939    2 Sheets-Sheet 1

INVENTOR
*Norman M. Thomas*
BY
ATTORNEY

May 27, 1941. N. M. THOMAS 2,243,363
COMBINATION FROZEN CONFECTION MOLD AND PROTECTIVE BASKET THEREFOR
Filed Dec. 14, 1939 2 Sheets-Sheet 2
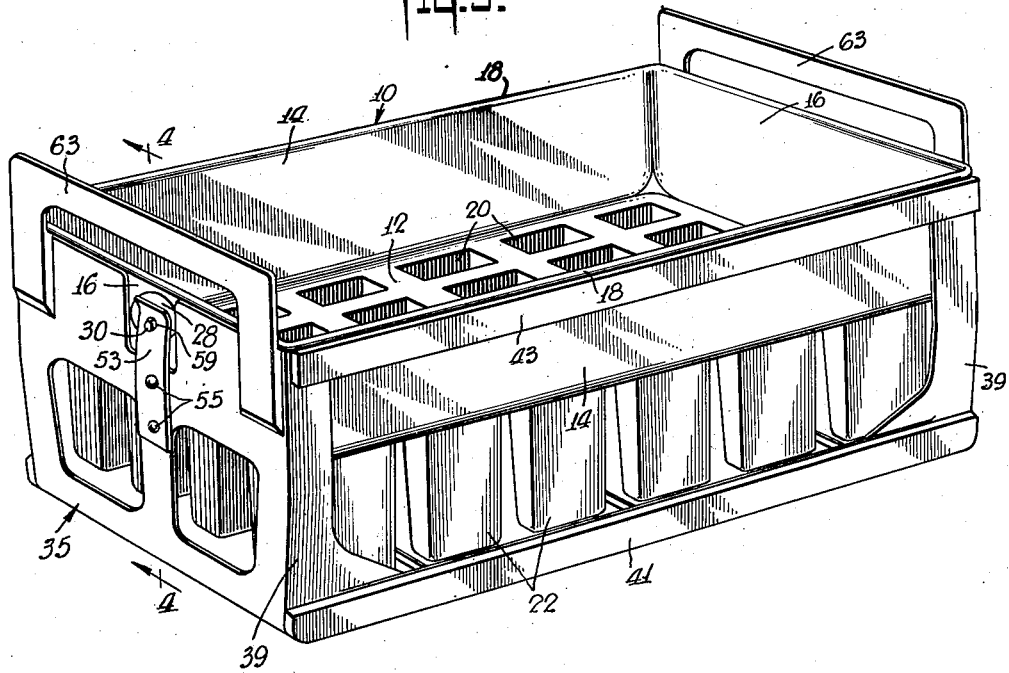
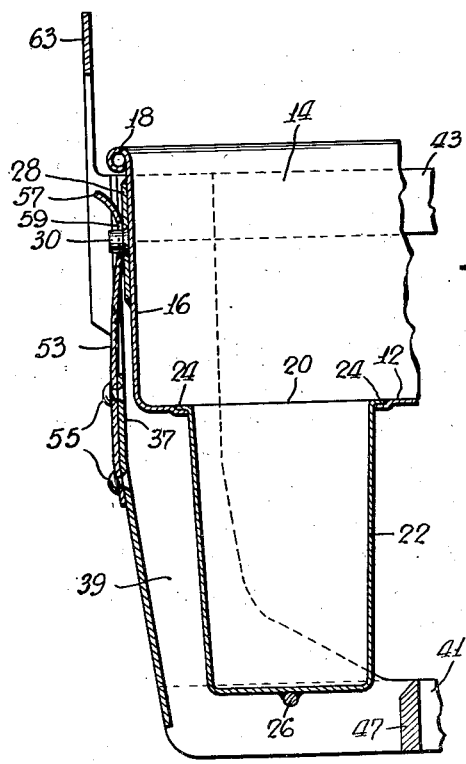
INVENTOR
Norman M. Thomas
BY
ATTORNEY Patented May 27, 1941

2,243,363

UNITED STATES PATENT OFFICE 2,243,363

COMBINATION FROZEN CONFECTION MOLD AND PROTECTIVE BASKET THEREFOR

Norman M. Thomas, Pelham, N. Y., assignor to Joe Lowe Corporation, New York, N. Y., a corporation of Delaware Application December 14, 1939, Serial No. 309,146

1 Claim. (Cl. 107—19)

The present invention relates to improvements in molds for forming and refrigerating frozen confectionery products, and it has particular relation to a combination multiple mold structure and protective basket for protecting the individual pendant molds thereof from damage through coming into contact with foreign objects, etc.

In the frozen confection industry a multiple mold structure, having twenty-four individual molds capable of producing twenty-four individual frozen confections, has become standard, and large quantities of such mold structures are employed by every manufacturing plant in the country. In these plants such confections are frozen generally in a rectangular brine tank of a conventional construction, having a circulating brine, into which the individual pendant molds are submerged. The mold structures are manually pushed through the brine tanks in rows upon supporting rails or guide tracks against the direction of the flow of the circulating brine. In such an operation the molds are filled and the mold structure is deposited in the brine at one end of the tank and removed at the opposite end. As each mold structure is placed in the brine tank, its forward end engages the rear end of the proceeding mold structure, and in such manner the mold structures are successively manually forced along their guide rails from one end of the brine tank to the other. It is apparent that suitable precautions must be taken to protect the pendant individual molds of such mold structure from damage through physical contact with other mold structures, parts of the brine tank such as the submerged edges of the guide rails, or other foreign objects. A damaged mold is useless, and even a small dent in the sides of one mold is sufficient to cause the entire mold structure to be withdrawn from production. Such a dent would destroy the shape of the finished confection, or prevent its removal from the mold. A slight tilting of a mold would force it out of alignment and would prevent its use because a handle stick could not be centrally positioned in the confectionery product to be formed in that particular mold. A small hole in any mold would permit the refrigerating brine to enter and contaminate all of the confections in the mold structure, rendering them unsaleable. There are many other causes too numerous to mention which damage molds and require protective guards to be mounted about such pendant molds of a mold structure to protect them from damage.

A conventional mold of the type in general use today in the frozen confection industry is shown in my prior United States Letters Patent No. 2,147,583, dated February 14, 1939. In the construction shown in this patent the protective means for the pendant molds are mounted directly on the individual molds and are a part of the mold structure. With the present trend to larger brine tanks, which are capable of receiving upwards of twenty mold structures positioned end to end in each longitudinal row of which there are many, it has been found that sufficient strength can not be mounted on the light weight material of the drawn mold to permit their movement through such tanks in the manner heretofore described without causing early damage to the mold structures. Furthermore, such mold structures are required to be lifted out of the brine tank and transported from there to the defrosting tank, to the washing operation, to the filling operation and back again to the opposite end of the brine tank, and any increase in weight becomes an important factor in tiring the operator. The lighter in weight the mold structure is the more production any given operator can handle over a given period of time.

A separable mold structure and protective frame member is shown in United States Letters Patent No. 2,080,816, issued May 18, 1937, wherein the protective frame is provided with a bottom which has a plurality of pockets for receiving the lower ends of a plurality of molds depending from a mold structure. In such a construction, the mold structure is supported entirely by the bottoms of its pendant molds resting on a bottom especially provided in the frame structure, and the circulating brine of a brine tank has no greater freedom of movement than it had in the other type of mold where the protective features were made a part of the mold structure, as in my patent aforementioned. Furthermore, in this particular construction, the protective frame is limited to the handling of a mold structure that is especially designed for it.

With my present invention, I have provided a combination frozen confection mold and protective basket therefor which obviates all of the disadvantages of the prior art constructions, and have provided a protective basket which will not impede the flow of brine therethrough and which will hold various types of mold structures regardless of the size, shape or length (within a given tolerance) of the pendant molds.

One of the objects of the present invention is to provide a combination mold structure and protective basket therefor which is entirely free of inaccessible corners where dirt and bacteria may collect, and which presents the optimum in sanitation, permitting rapid and effective cleaning.

Another object of the invention is the provision of a multiple mold structure and protective basket therefor wherein the depending molds are suspended entirely free from any supporting structures below the line of submersion, whereby the circulating refrigerating brine may come in intimate contact over the entire exposed surfaces of the molds and will have freedom of passage therethrough so that freezing of the contents will take place rapidly and uniformly.

Another object of the invention is to provide a combination mold structure and protective basket therefor which is exceedingly simple, inexpensive and durable in construction, easy to repair or replace any damaged parts, and where the protective basket is capable of being used in combination with different mold structures or similar mold structures having molds of different size, shape or spacing arrangement.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawings, forming a part hereof, wherein like numerals indicate like parts, in which:

Fig. 3 is an assembled perspective view of the mold structure shown in Fig. 1 mounted in operating nested position within the protective basket shown in Fig. 2; and Fig. 4 is a fragmentary sectional view of the combined structures shown in Fig. 3, the same being taken substantially along the line 4—4 thereof, looking in the direction of the arrows.

Figure 1:
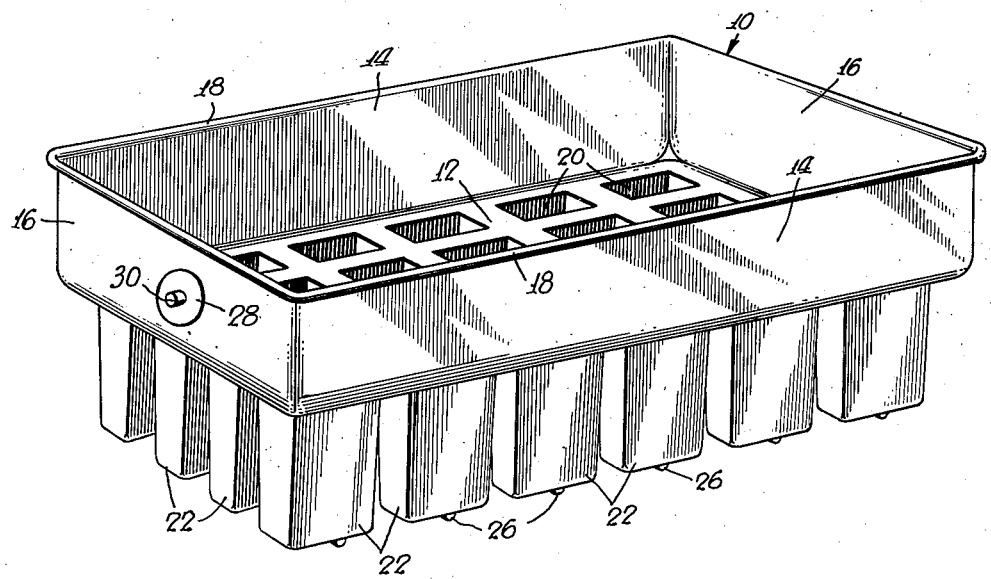
Fig. 1 is a perspective view of my improved mold structure, having a plurality of spaced individually depending molds, made in accordance with the principles of my invention.
Figure 2:
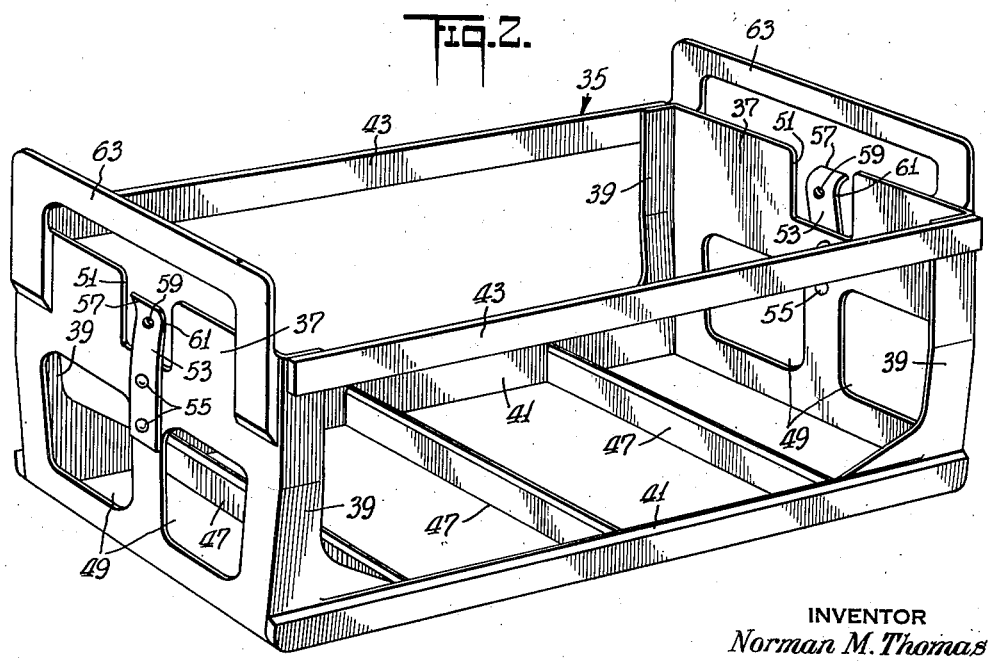
Fig. 2 is a perspective view of a protective basket for a multiple mold structure embodying the principles of my invention.

Referring now to the drawings, and particularly Fig. 1, there is shown a mold structure 10, consisting of a mold pan 12, having upstanding sidewalls 14 and end walls 16. The upper edges of the sidewalls 14 and end walls 16, being in perfect horizontal alignment, are bent outwardly and around a suitable reinforcing annular bead member 18, which extends perimetrically of the mold structure 10 adjacent the top thereof, as best shown in Fig. 4. The mold pan 12 and sidewalls 14 and end walls 16 are preferably drawn from a single piece of stainless sheet metal material so that no irregular and unsanitary seams or joints are formed therein. The mold pan 12 has a plurality of spaced apertures 20 therein, which are adapted to receive a plurality of individual open-top depending molds 22, which are joined and made an integral part of the mold pan 12, as shown in Fig. 4, by spot-welding, soldering or other suitable means, as indicated at 24, to form a seamless construction, as best shown in Fig. 1. The molds 22 are preferably drawn from a single piece of stock material so that no seams or joints are necessary, and they are tapered downwardly to facilitate removal of the finished confections therefrom. In the particular construction shown, the molds 22 are arranged in six transversely extending rows of four molds each, and the molds 22 of each row are connected at their bottoms by a suitable reinforcing rod or rib 26. These rods 26 serve as runners for supporting and sliding the mold structure 10 when it is not positioned within its protective basket. A plate in the form of a disk 28, having an axial projection or stud 30, is welded or otherwise fixedly secured centrally of the outer sides of each of the ends 16 of the mold structure 10 for suitably securing and locking the mold structure 10 in its protective basket as will be hereinafter more particularly pointed out.

A protective basket 35, which is intended to receive and support the mold structure 10, is constructed of heavy gauge stainless or rustless metal, and consists of a pair of spaced U-shaped end members 37, mounted in spaced relation with their projecting arms 39 extending toward each other. The arms 39 are suitably connected adjacent their lower edges by a pair of longitudinal bar-like members 41, and adjacent their top edges by a second pair of longitudinal bar-like members 43, forming a skeleton frame-like basket of substantially rectangular shape. The top edges of the bars 43 and the top edges of the U-shaped end members 37 are in perfect horizontal alignment to provide continuous surface perimetrically thereof for receiving the mold structure 10. These bar members 41 and 43 are welded or soldered to the arms 39 of the end members 37 to form a smooth creviceless joint which cannot collect dirt or harbor germs of any kind, and which can be easily cleaned very rapidly. It will be noted that the lower longitudinal bars 41 are braced transversely by suitable cross bars 47, which are likewise welded or soldered to provide a smooth and creviceless joint. The lower longitudinal bars 41 provide suitable runners for facilitating movement of the basket member 35 by sliding along the floor, guide rails of a brine tank, or other supporting structures. The cross-bars 47 serve to protect the extreme bottoms of the depending molds 22 from damage when the mold structure 10 is positioned in the basket member 35.

The lower half of the U-shaped end members 37, which comprises that portion that is submerged in the circulating brine, is apertured, as indicated at 49, to permit rapid movement of the circulating brine refrigerant therethrough and for facilitating circulation between the longitudinally extending rows of molds 22. A central slot is cut downwardly from the top of the end members 37, as indicated at 51, to permit engagement of the fastening member 53 of the basket member 35 with the stud 30 of the mold structure 10.

The fastening member 53 consists of a relatively short flat piece of spring steel that has been suitably riveted or spot-welded at one end, as indicated at 55, to the middle of each of the end frame members 37 so that its outer end 57 extending vertically upwardly is free. The free outer end 57 is provided with an aperture 59 intended to receive the stud-like projections 30 of the mold structure 10 when the latter is positioned within the basket member 35. The free outer end 57 of the latch member 53 is bent backwardly or outwardly, as indicated at 61, to provide a finger tab for exerting pressure outwardly and away from the basket member 35 for springing the latch member 53 away and out of engagement with the stud 39 of the mold structure 10.

In employing the above described apparatus in the manufacture of frozen confectionery products, the molds 22 may be filled with a suitable unfrozen, or fluid, confectionery material. The mold structure 10 is then ready to be telescopically positioned within the basket member 35 until the beaded edge 18 of the mold structure 10 rests on the top edges of the basket member 35. In this position the longitudinally projecting lugs or studs 39 of the mold structure 10 will extend through the apertures 59 of the latch members 53 on opposite ends of the basket member 35, thereby locking the two structures together.

The assembled apparatus is now ready to be deposited in the brine tank. The lower ends of the pendant molds 22, which are substantially free of supports, are submerged in the brine, and the brine refrigerant is entirely free to circulate around them and through them. In such a construction there is no chance for the formation of stagnant pools of heated brine to form about the molds 22, which can retard the rate of freezing, and the brine can circulate rapidly through the apparatus and the extracted heat from the mold structure and contents is quickly removed. This rapidity of movement of such warm brine facilitates freezing and also produces uniformity in the crystalline structure of the finished products. Uniformity in crystalline structure in the finished products is highly desirable, because it strengthens the finished product against breakage in handling, packaging, wrapping and distributing. The form of the crystalline structure is, of course, dependent upon the shape of the mold 22, which is especially designed to give not only a pleasing appearance to the finished confection but also a crystalline structure that will not tend to break easily in handling.

Upon removal of the basket 35 and mold structure 10 from the brine tank, the mold structure 10 can be separated from the basket member 35 by merely depressing the latch members 57 and lifting up on the mold structure 10. The basket member 35 can be immediately returned to the forward end of the brine tank for immediate use with another mold structure. The mold structure 10, which is considerably reduced in weight by removal of the protecting basket 35, can easily be carried by the operator to the defrosting, washing, and filling operations before its return for another trip through the brine tank with much less effort. This reduction in weight enables one operator to handle many more mold structures over a period of time than could be handled if the old conventional types of mold structures were employed.

The basket member 35 can be made of much stronger material when it is separated from the mold structure 10, because much heavier gauge materials can be used than when the protective guards are secured directly to the molds 22, which being of drawn metal are extremely thin and light in weight. Consequently, there is less danger of damage in the operation of shoving them in an end to end arrangement through a conventional brine tank.

With the present type of apparatus a small number of basket members 35 can be used to handle and protect a much greater number of mold structures, thereby effecting a considerable savings in the cost of equipment necessary for a given production. Either the mold structure 10 or the basket member 35 can be repaired or replaced in the event of damage without requiring the other to be removed from the production line. Inasmuch as all confectionery molds of the class described have been standardized as to the shape and size of the mold pan 12, including the upstanding sides 14 and ends 16, it will be obvious that molds of different sizes and shapes may be employed with my basket member 35 without difficulty. This advantageous feature will not be found in the prior art apparatus above-described wherein the lower ends of the molds are required to be nested in a suitable supporting structure which has been designed for a particular mold.

Although I have only described in detail one form which my invention may assume, it will be apparent to those skilled in the art that the invention is not so limited, but that various modifications may be made therein without departing from the spirit thereof or from the scope of the appended claim.

What I claim is:——

Apparatus of the character described for forming and refrigerating frozen confections which comprises, in combination, a suspended mold structure consisting of an open-top mold pan having horizontal supporting means extending perimetrically adjacent its upper edges and a plurality of depending molds, said mold pan having latch engaging means mounted outwardly on opposite ends thereof, and an open-top protective basket of open frame construction having handles mounted on opposite ends thereof for carrying the same, said basket having horizontal means extending perimetrically for receiving the supporting means of the mold structure for holding the latter in a suspended position within said basket, said basket having latching means mounted on its opposite ends adjacent said handles for receiving the latch engaging means on said mold structure, whereby said latching means may be manually operated by the operator while holding the basket by its handles.

NORMAN M. THOMAS.